United States Patent
Yasui et al.

(10) Patent No.: US 10,609,940 B2
(45) Date of Patent: Apr. 7, 2020

(54) COLORLESS AND CLEAR BEVERAGES CONTAINING FLAVORINGS

(71) Applicant: SUNTORY HOLDINGS LIMITED, Osaka (JP)

(72) Inventors: Yohei Yasui, Kanagawa (JP); Daigo Ibusuki, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 15/552,592

(22) PCT Filed: Feb. 25, 2016

(86) PCT No.: PCT/JP2016/055605
§ 371 (c)(1),
(2) Date: Aug. 22, 2017

(87) PCT Pub. No.: WO2016/111383
PCT Pub. Date: Jul. 14, 2016

(65) Prior Publication Data
US 2018/0064142 A1 Mar. 8, 2018

(30) Foreign Application Priority Data

Feb. 25, 2015 (JP) .................. 2015-035832

(51) Int. Cl.
| | |
|---|---|
| *A23L 2/66* | (2006.01) |
| *A23L 2/70* | (2006.01) |
| *A23L 2/00* | (2006.01) |
| *A23L 2/56* | (2006.01) |
| *C11B 9/00* | (2006.01) |

(52) U.S. Cl.
CPC .................. *A23L 2/66* (2013.01); *A23L 2/00* (2013.01); *A23L 2/56* (2013.01); *A23L 2/70* (2013.01); *A23V 2002/00* (2013.01); *C11B 9/00* (2013.01)

(58) Field of Classification Search
None
See application file for complete search history.

(56) References Cited

U.S. PATENT DOCUMENTS

| | | | | |
|---|---|---|---|---|
| 2,762,710 A | * | 9/1956 | Bode ....................... | C13K 5/00 426/48 |
| 2003/0099753 A1 | | 5/2003 | Yang | |
| 2006/0147602 A1 | | 7/2006 | Sherwood et al. | |
| 2007/0154614 A1 | * | 7/2007 | Sherwood ............. | A23C 21/08 426/583 |
| 2007/0207187 A1 | * | 9/2007 | Yajima .................... | A23C 9/12 424/439 |

FOREIGN PATENT DOCUMENTS

| | | | | |
|---|---|---|---|---|
| CN | 101347155 | | 1/2009 | |
| CN | 101347155 | | 5/2012 | |
| EP | 2760296 A2 | * | 8/2014 | ............... A23L 2/56 |
| JP | 62-74260 | | 4/1987 | |
| JP | 2000-333654 | | 12/2000 | |
| JP | 2003-096486 | | 4/2003 | |
| JP | 2010-099025 | | 5/2010 | |
| WO | 2007/106731 | | 9/2007 | |

OTHER PUBLICATIONS

Search Report issued in International Bureau of WIPO Patent Application No. PCT/JP2016/055605, dated May 17, 2016.
Holsinger et al., "Fortification of soft drinks with protein from cottage cheese whey", Advances in Experimental Medicine and Biology; [Advances in Experimental Medicine and Biology], Springer, US, vol. 105, XP009117891, Jan. 1, 1978, pp. 735-747.
Official Communication issued in European Patent Office (EPO) Patent Application No. 1735121.2, dated Sep. 21, 2018.
Office Action issued in Japan Counterpart Patent Appl. No. 2016-568767, dated Jul. 30, 2019, along with an English translation thereof.
Office Action issued in Taiwan Counterpart Patent Appl. No. 105105675, dated Aug. 19, 2019.

* cited by examiner

*Primary Examiner* — Tamra L. Dicus
(74) *Attorney, Agent, or Firm* — Greenblum & Bernstein, P.L.C.

(57) ABSTRACT

A colorless and clear beverage containing a flavoring is provided that masks an unpleasant taste or smell due to the deterioration of the flavoring and to which body is imparted. Whey protein is incorporated in the flavoring containing colorless and clear beverage.

3 Claims, No Drawings

COLORLESS AND CLEAR BEVERAGES CONTAINING FLAVORINGS

TECHNICAL FIELD

The present invention relates to colorless and clear beverages containing flavorings, and more particularly, to beverages that are colorless and clear like water and which yet allow the deterioration smells of the flavorings to be less sensed while exhibiting body.

BACKGROUND ART

In the context of consumers becoming more conscious of health and desiring for natural products, the popularity of "flavored water" is increasing. Flavored water is a beverage that consists of water such as mineral water to which raw materials such as flavorings, extracts or fruit juice have been added; also known as "near water," flavored water is a beverage just looking like water.

Flavored water, especially something like "near water" which is colorless and clear like water and yet has a flavor like that of fruit, etc. is generally characterized by a relish that has such a clean finish and drinkability that consumers can drink it instead of water whenever they get thirsty; however, compared with other ordinary beverages (say, colored or turbid drinks), flavored water has less body and its taste often feels rather bland. In addition, it is known that flavorings in beverages will deteriorate under exposure to light or heat, causing an unusual taste or smell (off-flavor).

Lots of methods have been proposed for preventing the deterioration of flavorings; for example, Patent Document 1 discloses the use of oxypeucedanin hydrate and/or byakangelicin as a deterioration preventing agent. In addition, Patent Document 2 discloses the use of tea polyphenol to suppress the generation of off-flavor causing p-methylacetophenone from citral in citrus flavorings.

CITATION LIST

Patent Literature

Patent Document 1: JP 2010-99025A
Patent Document 2: JP 2003-96486A

SUMMARY OF INVENTION

Technical Problem

Beverages that are colorless and clear like water permit better release of volatile components than cloudy or turbid beverages, providing a greater chance for unusual-smell or taste causing substances to reach the tongue or nose of consumers directly, with the result that the deterioration of flavorings will become more pronounced.

As mentioned above, various methods have been proposed for suppressing the deterioration of flavorings but in practice it has been difficult to suppress the deterioration of flavorings while maintaining the water-like colorlessness and clearness of beverages. In addition, a problem with clear beverages that contain relatively small amounts of components is that if heretofore reported deterioration suppressants are added, the balance in the relish of the beverages is easily upset and it has also been difficult to maintain the relish of the beverages and yet rendering the deteriorated aroma and taste to be less sensed. For example, the antioxidant vitamin C incorporated in a certain amount as an agent for suppressing the deterioration of flavorings has raised the problem that it turns brown over time, causing the beverage to become colored or develop a taste peculiar to the vitamin C, What is more, even if one wants to impart body to beverages that are colorless and clear like water, the components that can be used are limited considering the need to maintain the water-like appearance of the beverages; indeed, the goal has been difficult to attain.

An object, therefore, of the present invention is to provide a novel beverage from which any unusual taste or smell due to the deterioration of flavorings will be less sensed and which also retains its colorlessness and clearness while possessing sufficient body to feature good drinkability.

Solution to Problem

The present inventors conducted intensive studies with a view to solving the above-described problems; as a result, they found that when whey protein was contained in colorless and clear beverages incorporating flavorings, it was possible to provide beverages that maintained their colorlessness and clearness and from which any unusual taste or smell due to the deterioration of flavorings would be less sensed, with an additional advantage that body could be imparted to the beverages. The present invention has been accomplished on the basis of this finding.

The present invention encompasses, but is not limited to, the following:
(1) A packed beverage that contains a flavoring and whey protein and which has an absorbance of 0.06 or less at a wavelength of 660 nm and a $\Delta E$ value (color difference) of 3.5 or less, with pure water taken as a reference.
(2) The beverage as recited in (1), which contains 0.9 ppm or more of the whey protein.
(3) The beverage as recited in (1) or (2) above, which has a reading of 3.0 to 10.0 on a sugar refractometer (Brix).

Advantageous Effects of Invention

By combining flavorings with whey protein in beverages that are colorless and clear like water, novel beverages can be prepared, from which the deterioration smell or taste of the flavorings is less sensed whereas the body that has been absent from the colorless and clear beverages is sensed. The assignee of the subject application previously studied the bad aftertaste of heat-sterilized milk containing coffee beverages and discovered that whey protein was the main factor (U.S. Pat. No. 5,657,200). It was an unexpected result of the present invention that the deteriorated aroma and taste of flavorings could be masked by using whey protein.

As far the Applicant knows, beverages that contain milk proteins such as whey protein and which yet are colorless and clear like water have not so far been commercially available.

DESCRIPTION OF EMBODIMENTS (Flavorings)

The beverage of the present invention contains flavorings. Flavorings are generally used to make up for the loss of pleasant aroma or taste that occurs during the manufacture or storage of foods and drinks, or to impart a new flavor to foods and drinks.

The flavorings that can be used in the beverage of the present invention are not particularly limited if they can be used in beverages and do not impair their colorlessness and clearness. Flavorings that present fruit-like aromas are preferred because they match the refreshing image of beverages that are colorless and clear like water. Such flavorings include: naturally derived products such as rind oil and extracts obtained by immersing fruits, etc. in organic solvents; and chemically synthesized fruit-like aroma components. Examples of the "fruit" in flavorings that present fruit-like aromas include not only citruses such as orange, Satsuma, mandarin, lemon, and lime but also other fruits like peach, grape, strawberry, apple, pineapple, mango, and melon. Among the applicable flavorings, those which present the aroma of citrus fruits are preferred because their refreshing aroma and taste match the refreshing image of clear beverages.

The amount of the flavoring in the beverage should at least be the quantity at which the aroma of the flavoring can be sensed when the beverage is drunk; specifically, the amount of interest is determined by the strength of the flavoring itself. It is also required that the amount of interest should not impair the colorlessness and clearness of the beverage. Consider, for example, the case of using a flavoring in the form of an ethanol extract of a fruit; it may be used in amounts of about 1 to 10,000 ppm depending on its strength as well as the color and clarity of the beverage containing the same.

(Whey Protein)

Flavorings are generally known to deteriorate upon exposure to light or heat, producing an offensive unusual taste or smell (off-flavor). The beverage of the present invention, since it contains not only a flavoring but also whey protein, is capable of masking any offensive off-flavor that results from the deterioration of the flavoring, with the additional advantage that body can be imparted to the beverage.

Whey is a liquid portion that is left after removing the fat content and casein from milk (in most cases, cow milk), and whey contains galactose, minerals, water-soluble vitamins, water-soluble proteins and so on. A mixture of the water-soluble proteins contained in whey is used as whey protein in the present invention. The why protein includes β-lactoglobulin, α-lactoglobulin, serum albumin, euglobulin, pseudoglobulin, proteose peptone, and so on; among these, β-lactoglobulin is the most abundant protein in whey and accounts for more than 50% of the entire whey protein.

The amount of the whey protein in the beverage of the present invention can be determined depending on the kind and quantity of the flavoring used in the beverage, as well as on the degree of the body that need be imparted to the beverage. Considering the effectiveness in masking and body imparting, the desired colorlessness and clearness of the beverage, and the body to be imparted to an appropriate degree, the content of whey protein in the beverage is preferably at least 0.9 ppm, more preferably between 0.9 to 10,000 ppm, in terms of the quantity of protein. If desired, the quantity of β-lactoglobulin in the beverage may be used as an index for expressing the amount of the whey protein in the beverage. The amount of the whey protein in the beverage of the present invention is preferably at least 0.5 ppm, more preferably between 0.5 to 5000 ppm, in terms of the quantity of β-lactoglobulin. The quantity of β-lactoglobulin in the beverage can be measured by known techniques. For example, it can be measured by the following methods.

<Analysis of β-lactoglobulin>

(1) Sample Preparation

A beverage solution containing carbon dioxide gas is decarbonated in the usual manner. A 2-mL aliquot of the beverage solution is weighed in a centrifugal precision filtration tube (Amicon Ultra-4 mL PLBC Ultracel-3 kDa; product of Merck). If the solution has a Brix greater than 10, it is diluted with distilled water for liquid chromatography until the Brix becomes lower than 10. The diluted solution is centrifuged with a centrifugal filter (4000×g, 30 min, 20° C.) and the filtrate is discarded. To the trapped fraction on the filter, 3 mL of distilled water for liquid chromatography is added and the mixture is again centrifuged with a centrifugal filter (4000×g, 30 min, 20° C.). The trapped fraction is drawn with a pipette and transferred into a measuring flask with a capacity of 10 mL. Distilled water (2 mL) is poured onto the filter so that the trapped matter that has deposited on the filter during pipetting is thoroughly washed out; the washings are also poured into the above-mentioned measuring flask with a capacity of 10 mL. Distilled water is added to make 10 mL and the solution obtained by intimate blending is used as a sample for analysis.

(2) Analysis by ELISA

For analysis, an ELISA kit (Allergeneye® ELISA II of Prima Meat Packers, Ltd; index protein for cow milk: β-lactoglobulin) is used. Method of analysis is in accordance with the instruction manual for the ELISA kit. If analysis produces a measurement value that lies outside the range specified for the kit, the dilution ratio used in the process of sample preparation is adjusted appropriately and another measurement is performed.

(Colorless and Clear Beverage)

The beverage of the present invention is colorless and clear. To say "the beverage is clear" means that the beverage is not cloudy like a so-called isotonic drink nor does it have haze like a turbid fruit juice and that it is visibly clear like water. The clarity of the beverage can be expressed as numbers by using, for example, a known technique that measures the turbidity of liquids. To give an example, a beverage that has an absorbance of no more than 0.06 at a wavelength of 660 nm as measured with an ultraviolet visible spectrophotometer (e.g. UV-1600 of Shimadzu Corporation) may be described as being "clear."

To say "the beverage is colorless" means that the beverage does not have any visibly recognizable color. The color of the beverage can be expressed as numbers by using, for example, a known technique that measures the color difference of an object. To give an example, a beverage that transmits light at a ΔE value of no more than 3.5 as measured with a color meter (e.g. ZE2000 of NIPPON DENSHOKU INDUSTRIES CO., LTD.) using pure water as a reference may be described as being "colorless." A preferred ΔE value is no more than 2.3.

(Others)

The beverage of the present invention contains not only the flavoring and whey protein but also other ingredients for ordinary beverages that may be optionally added to the extent that will not impair the clearness of the beverage; examples of such optional ingredients include sweeteners, acidulants, antioxidants, salts, bitterness imparting agents, enrichments (e.g. vitamins), pH modifiers, and so on.

Sweeteners include, for example: natural sweeteners such as fructose, sugar, high fructose corn syrup, glucose, maltose, sucrose, high fructose syrup, sugar alcohol, oligosaccharides, honey, squeezed sugarcane juice (black molasses), starch syrup, stevia powder, stevia extract, *Siraitia grosvenorii* powder, *Siraitia grosvenorii* extract, licorice powder, licorice extract, *Thaumatococcus daniellii* seed powder, and *Thaumatococcus daniellii* seed extract; and artificial sweeteners such as acesulfame potassium, sucralose, neotame, aspartame, and saccharin. Among these, natural sweeteners are preferably used from the viewpoint of imparting a clean finish, drinkability and a natural relish, and fructose, glucose, maltose, sucrose and sugar are used with particular advantage. The above-mentioned sweetness components may be used either alone or as a mixture of two or more species.

The beverage of the present invention preferably has a Brix of 3.0 to 10.0, more preferably 4.5 to 7.0. The term Brix refers to a value measured as a reading on sugar refractometer. The low Brix beverage mentioned above has a relish that gives a clean finish and its taste advantageously has a good match with the refreshing image that derives from its clear appearance.

The beverage of the present invention may be prepared as heat-sterilized and packed in a container. The applicable container is not particularly limited and may be exemplified by a PET bottle, aluminum can, steel can, paper pack, chilled cup, bottle, and so on. Among these, a transparent container, say, a PET bottle is preferred because the colorless and transparent appearance which characterizes the beverage of the present invention can be checked as it remains packed in the container. Flavorings are generally known to deteriorate under heat from sterilization during the manufacture of packed beverages or upon exposure to external light during storage after packing in the transparent container; however, the beverage of the present invention which contains whey protein has an advantage in that the unusual taste or smell resulting from the deterioration of the flavoring is sufficiently masked to become less sensed. It may well be said that the colorless and clear beverage of the present invention is optimum for packing in a transparent container after heat sterilization. If heat sterilization is to be performed, it is not particularly limited in type and may be performed using a conventional technique such as UHT sterilization or retort sterilization. The temperature of the heat sterilizing step is not particularly limited and it may be 65 to 130° C., preferably 85 to 120° C., which lasts for 10 to 40 minutes. It should, however, be noted that if an intensity of sterilization equivalent to these conditions is secured, sterilization at a suitable temperature for several seconds, say, 5 to 30 seconds may be performed without any problem.

EXAMPLES

Hereinafter, the present invention will be described by reference to working examples which are by no means intended to limit the scope of the present invention.

Reference Example 1

To water, high fructose corn syrup was added to prepare a solution adjusted to Brix 6.0; to the solution, citric acid and a lemon flavoring were added in respective amounts of 0.12 mass % and 0.1 mass %; thereafter, trisodium citrate was added for pH adjustment to 3.6. Furthermore, skim milk or an emulsion preparation (a vegetable fat or oil emulsified with gum arabic) was added to have the concentration (unit: mass %) cited in the following Table 1, and the resulting solution was filled into a sealable container (a glass bottle with a capacity of 180 ml) and heat-sterilized at 85° C. for 10 minutes. By subsequent storage at 55° C. for 2 days, accelerated deterioration occurred, resulting in the preparation of trial products 1 to 3. The thus prepared trial products 1 to 3 were subjected to absorbance measurement with a spectrophotometer (UV-1600 of Shimadzu Corporation) at a wavelength of 660 nm; the results are shown in Table 1. Trial product 1 was colorless and transparent whereas trial products 2 and 3 were cloudy. The intensity of the deterioration smell from the drinking of these trial products was evaluated by three panelists on a five-score rating criterion, with 5 being the best (comparable to a chilled sample that was stored in a refrigerator without accelerated deterioration after heat sterilization) and 1 being the worst (considerably more deteriorated than the chilled sample to give off a strong unusual smell). The averaged evaluation scores are cited in Table 1.

TABLE 1

|  | Chilled sample | Trial product 1 | Trial product 2 | Trial product 3 |
| --- | --- | --- | --- | --- |
| Skim milk (%) | — | — | 0.06 | — |
| Emulsion preparation (%) | — | — | — | 0.02 |
| Absorbance at 660 nm | 0.001 | 0.001 | 0.071 | 0.087 |
| Sensory evaluation score | — | 2.3 | 3.3 | 3.3 |
| Comments | Natural acidity and solid fruit juice feeling | Acidity and bitterness sensed as from rotten citrus | With decreased fruit juice feeling, somewhat unnatural acidity sensed | With decreased fruit juice feeling, somewhat unnatural acidity sensed |

According to the data in Table 1, the deterioration smell from the flavoring in cloudy trial products 2 and 3 was less sensed than that in clear trial product 1, indicating that clearness made the deterioration smell from the flavoring more pronounced.

Example 1

To water, high fructose corn syrup was added to prepare a solution adjusted to Brix 6.0; to the solution, citric acid and a lemon flavoring were added in respective amounts of 0.12 mass % and 0.1 mass %; thereafter, trisodium citrate was added for pH adjustment to 3.6. Further, a commercial product of whey powder (protein concentration, 12.5 mass %), a purified product of whey protein (protein concentration, 92.0 mass %), or a *lactobacillus* fermented whey liquor (protein concentration, 0.060 mass %) was added so that the protein concentration (unit: mass %) in beverage would take the values cited in Table 2 below, and the thus conditioned solutions were each filled into a sealable container (a glass bottle with a capacity of 180 ml) and heat-sterilized at 85° C. for 10 minutes. By subsequent storage at 55° C. for 2 days, accelerated deterioration was caused, resulting in the preparation of trial products 4 to 9. The thus prepared trial products 4 to 9 were each "colorless and clear", just looking like water; they all had absorbance values of no more than 0.06 upon measurement with a spectrophotometer (UV-1600 of Shimadzu Corporation) at a wavelength of 660 nm, and transmitted light at ΔE values of no more than 3.5 as measured with a color meter (ZE2000 of NIPPON DENSHOKU INDUSTRIES CO., LTD.) using pure water as a reference.

In the same way as described above, trial products 10 to 13 were prepared by adding a commercial product of whey powder (protein concentration, 12.5 mass %) or a *lactobacillus* fermented whey liquor (protein concentration, 0.060 mass %) so as to give the concentrations cited in Table 3 below. Trial products 10 to 13 were each "colorless and clear", just looking like water; they all had absorbance values of no more than 0.06 upon measurement with a spectrophotometer (UV-1600 of Shimadzu Corporation) at a wavelength of 660 nm, and transmitted light at ΔE values of no more than 3.5 as measured with a color meter (ZE2000 of NIPPON DENSHOKU INDUSTRIES CO., LTD.) using pure water as a reference. Trial products 10 to 13 were further measured for the concentration of β-lactoglobulin in the trial product. Specifically, concentration measurement was carried out by the following procedure.

(1) Sample Preparation

A beverage solution containing carbon dioxide gas is decarbonated in the usual manner. A 2-mL aliquot of the beverage solution is weighed in a centrifugal precision filtration tube (Amicon Ultra-4 mL PLBC Ultracel-3 kDa; product of Merck). If the solution has a Brix greater than 10, it is diluted with distilled water for liquid chromatography until the Brix becomes lower than 10. The diluted solution is centrifuged with a centrifugal filter (4000×g, 30 min, 20° C.) and the filtrate is discarded. To the trapped fraction on the filter, 3 mL of distilled water for liquid chromatography is added and the mixture is again centrifuged with a centrifugal filter (4000×g, 30 min, 20° C.). The trapped fraction is drawn with a pipette and transferred into a measuring flask with a capacity of 10 mL. Distilled water (2 mL) is poured onto the filter so that the trapped matter that has deposited on the filter during pipetting is thoroughly washed out; the washings are also poured into the above-mentioned measuring flask with a capacity of 10 mL. Distilled water is added to make 10 mL and the solution obtained by intimate blending is used as a sample for analysis.

(2) Analysis by ELISA

For analysis, an ELISA kit (Allergeneye® ELISA II of Prima Meat Packers, Ltd; index protein for cow milk: β-lactoglobulin) was used. Method of analysis was in accordance with the instruction manual for the ELISA kit.

The intensity of the deterioration smell from the drinking of the trial products was evaluated by three panelists on a five-score rating criterion, with 5 being the best (comparable to the chilled sample) and 1 being the worst (considerably more deteriorated than the chilled sample to give off a strong unusual smell). The averaged evaluation scores and the protein concentrations of trial products 4 to 9 are cited in Table 2. In addition, the protein concentrations and the β-lactoblobulin concentrations of trial products 10 to 13, as well as their averaged evaluation scores are cited in Table 3. Note that the averaged sensory evaluation scores were the results of overall evaluation based on the following criteria: no effect at all (X) when the score was less than 2.5; almost no effect at all (Δ) when the score was between 2.5 to less than 3.5; effective (◯) when the score was between 3.5 to less than 4.0; very effective (◎) when the score was 4.0 or more.

TABLE 2

| | Chilled sample | Trial product 1 | Trial product 4 | Trial product 5 | Trial product 6 | Trial product 7 | Trial product 8 | Trial product 9 |
|---|---|---|---|---|---|---|---|---|
| Type of whey protein | — | — | Whey powder | Whey powder | Purified whey protein | Purified whey protein | *Lactobacillus* fermented whey liquor | *Lactobacillus* fermented whey liquor |
| Concentration in beverage (ppm) | — | — | 1.9 | 12.5 | 1.8 | 12.9 | 0.9 | 3.0 |
| Sensory evaluation score | — | 2.3 | 3.7 | 4.0 | 3.7 | 4.0 | 4.0 | 4.3 |
| Comments | Natural acidity and solid fruit juice feeling | Acidity and bitterness sensed as from rotten citrus | Somewhat bitter but natural acidity sensed; Relish with slight body sensed | Natural acidity and fruit juice feeling; Relish with slight body sensed | Somewhat bitter but natural acidity sensed; Relish with body sensed | Natural acidity and fruit juice feeling; Relish with solid body sensed | Natural acidity and fruit juice feeling; Relish with solid body sensed | Natural acidity and solid fruit juice feeling; Complex relish with solid body sensed |

TABLE 3

| | Trial product 10 | Trial product 11 | Trial product 12 | Trial product 13 |
|---|---|---|---|---|
| Type of whey protein | Whey powder | Whey powder | *Lactobacillus* fermented whey liquor | *Lactobacillus* fermented whey liquor |
| Protein concentration in beverage (ppm) | 2.5 | 12.5 | 0.12 | 1.8 |
| β-lactoglobulin concentration in beverage (ppm) | 1.85 | 9.51 | 0.01 | 0.60 |
| Sensory evaluation score | 3.7 | 4.0 | 2.7 | 4.0 |
| Comments | Somewhat bitter but natural acidity sensed; Relish with slight body sensed | Natural acidity and fruit juice feeling; Relish with body sensed | Acidity and bitterness sensed as from rotten citrus; Relish with slight body sensed | Natural acidity and solid fruit juice feeling; Complex relish with solid body sensed |

From the data in Table 2, it can be seen that trial products 4 to 9 containing the whey protein in amounts not smaller than a specified value maintained the colorlessness and clearness of the beverage and yet the unusual taste or smell from the deterioration of the flavoring was less sensed. It can also be seen that body was imparted to the beverage. From the data in Table 3, it can be seen that trial products 10, 11 and 13 maintained the colorlessness and clearness of the beverage and yet the unusual taste or smell from the deterioration of the flavoring was less sensed, with the additional feature of body being imparted to the beverage. Speaking of trial product 12, bitterness was sensed but at the same time, a relish with slight body was sensed.

The invention claimed is:

1. A packed beverage that contains water, a flavoring and a *lactobacillus* fermented whey liquor comprising whey protein and which has an absorbance of 0.06 or less at a wavelength of 660 nm and a ΔE value (color difference using pure water as reference) of 3.5 or less, wherein the beverage is packed in a container, and the beverage contains between 0.9 to 10,000 ppm of the whey protein.

2. The beverage according to claim 1 which has a reading of 3.0 to 10.0 on a sugar refractometer (Brix).

3. The beverage according to claim 1, wherein the amount of whey protein in the beverage, measured as amount of β-lactoglobulin in the beverage, is at least 0.5 ppm.

* * * * *